P. C. INGERSOLL.
Preparing Cotton-Seed for Planting.
No. 66,089. Patented June 25, 1867.
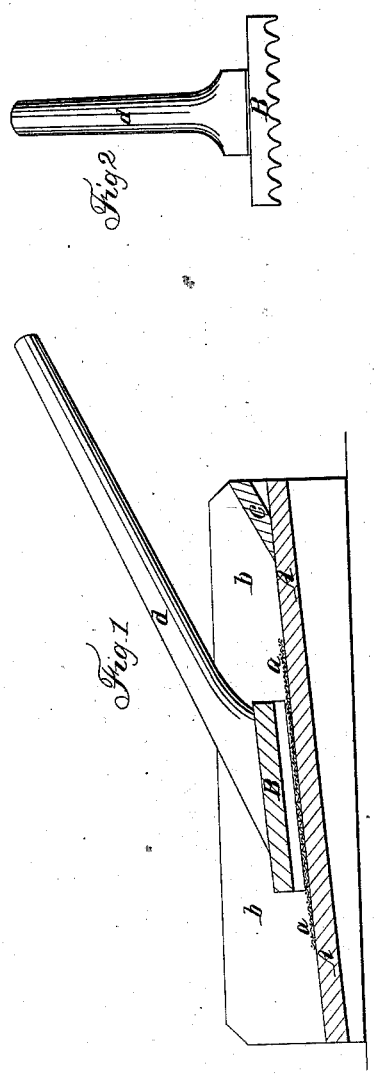
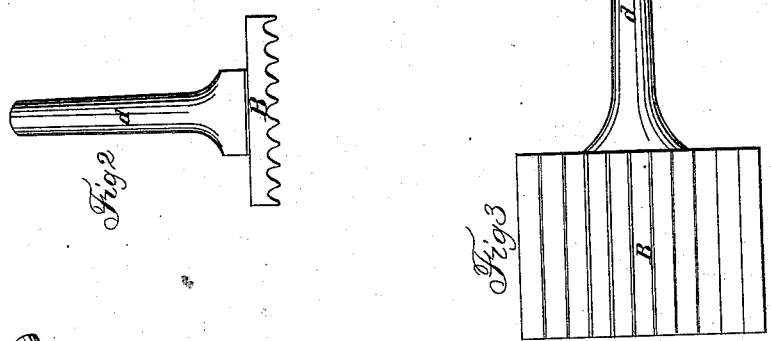
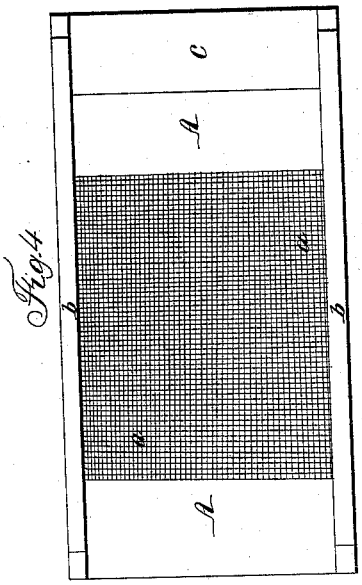
Witnesses:
JH Coombs
LM Reed
Inventor.
P C Ingersoll

United States Patent Office.

PLATT C. INGERSOLL, OF GREENPOINT, NEW YORK, ASSIGNOR TO HIMSELF AND HORACE F. DOUGHERTY, OF SAME PLACE.

Letters Patent No. 66,089, dated June 25, 1867.

IMPROVEMENT IN PREPARING COTTON SEED FOR PLANTING.

The Schedule referred to in these Letters Patent and making part of the same.

TO ALL WHOM IT MAY CONCERN:

Be it known that I, P. C. INGERSOLL, of Greenpoint, in the county of Kings, and State of New York, have invented a new and improved Process for Preparing Cotton Seed for Planting; and I do hereby declare that the following is a full, clear, and exact description of the same, reference being had to the accompanying drawings, making a portion of this specification, in which—

Figure 1 is a vertical longitudinal section of the apparatus preferably employed in carrying out my invention.

Figure 2 is an end view of a portion of the same.

Figure 3 is an inverted plan of the same portion thereof.

Figure 4 is a plan view of another portion thereof.

Similar letters of reference indicate corresponding parts in all the figures.

The nature of my invention consists in subjecting cotton seed to a rubbing action between a corrugated and a roughened surface, whereby the fibres or filaments of the seed are closely wrapped or wound around the same in such manner that the tendency of the said seeds to cling together and form lumps or clusters, by the interlacing of their fibres or filaments, is effectually overcome, the seeds being by these means rendered capable of separating very readily from each other, as is more especially required in planting the same by machinery. The invention further consists in a novel means whereby the aforesaid process may be very cheaply and easily performed or carried out.

To enable others to understand the nature of my invention, I will proceed to describe it with reference to the drawings.

A shows a bed, which may be formed of a wooden plank, and the upper surface of which is made moderately rough, the said roughness of such surface being obtained preferably by securing thereon a piece of wire cloth, a, as shown in figs. 1 and 2. This bed may be supported by two side-boards b, which extend up beyond the lateral edges of the bed, so as to prevent the seed, during the operation of preparing the same for planting, from falling off therefrom. One end of this bed is made somewhat higher than the other, and may be furnished with a transverse end-piece, c, the office of which is to prevent the seed from being thrown off from the bed A, at the said end thereof. B represents the "rubber," which may consist of a wooden block fixed upon the end of a suitable handle, d, and the under surface of which is grooved or corrugated longitudinally, as shown in figs. 1, 2, and 3. The width of this rubber should be such as to allow it to be moved longitudinally between the side-boards b of the bed A during the operation of preparing the cotton seed, as follows: The seed having been first slightly moistened, in order to render the fibres or filaments upon the surface thereof more limp or flexible, are placed upon the bed A. The "rubber" B is then placed over the seed, upon the aforesaid bed, and a reciprocating movement is communicated thereto by means of the handle d, the corrugated under side or surface of the said rubber being pressed down upon the seed in such manner that the seed is rolled over and over between the aforesaid corrugated surface of the rubber and the roughened upper surface of the bed A, by which means the moistened filaments upon the seeds are pressed closely upon and around the same, in such a way as to avoid all liability of the filaments of the different seeds from intertwining with each other, and thus causing the seeds to hang together in clusters, the filaments of each seed being, in fact, by these means, matted as it were around the same. The corrugations of the rubber, by separating the seeds transverse to the movement of the said rubber, prevent the filaments from rolling into strings connecting several seeds together, which would be very likely to occur if the rubbing surface of the rubber were made flat or simply roughened. By thus wrapping the fibrous covering or filaments of the seeds closely around them, their tendency to cling together, by the interlacing of such filaments, is effectually overcome, and the seed is thus adapted to be sown or planted by any suitable machine or apparatus.

What I claim as my invention, and desire to secure by Letters Patent, is—

1. The process of preparing cotton seed for planting by subjecting the same to a rubbing action between a corrugated and a rubbing surface, substantially as herein set forth.

2. The corrugated rubber, in combination with the bed, having a roughened surface, substantially as and for the purpose specified.

P. C. INGERSOLL.

Witnesses:
J. W. COOMBS,
G. W. REED.